US008121714B2

(12) United States Patent
Yamashita et al.

(10) Patent No.: US 8,121,714 B2

(45) Date of Patent: Feb. 21, 2012

(54) AUDIO PROCESSING APPARATUS AND AUDIO PROCESSING METHOD

(75) Inventors: Kosei Yamashita, Kanagawa (JP); Shinichi Honda, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 926 days.

(21) Appl. No.: 12/093,049

(22) PCT Filed: Jun. 26, 2007

(86) PCT No.: PCT/JP2007/000699

§ 371 (c)(1), (2), (4) Date: Jun. 9, 2008

(87) PCT Pub. No.: WO2008/065731

PCT Pub. Date: Jun. 5, 2008

(65) Prior Publication Data

US 2008/0269930 A1 Oct. 30, 2008

(30) Foreign Application Priority Data

Nov. 27, 2006 (JP) ................................ 2006-319368

(51) Int. Cl.
*G06F 17/00* (2006.01)

(52) U.S. Cl. ........................................................ 700/94

(58) Field of Classification Search ..................... 700/94
See application file for complete search history.

(56) References Cited

FOREIGN PATENT DOCUMENTS

| | | | |
|---|---|---|---|
| JP | 1031500 | | 2/1998 |
| JP | 10256858 | | 9/1998 |
| JP | 200075876 | A | 3/2000 |
| JP | 2000181593 | A | 6/2000 |
| JP | 2001095081 | A | 4/2001 |
| JP | 2006270741 | | 10/2006 |

OTHER PUBLICATIONS

International Preliminary Report on Patentability for corresponding Japanese PCT application PCT/JP2007/000699, Jun. 3, 2009.

Office Action for corresponding Japanese Patent Application No. 2006-319368 , Jun. 7, 2011.

"Zatsuonchu kara no Renzokuon Chikaku ni Okero KuriKaeshi Gakushu no Kuba" by: Masayuki Matsumoto, IEICH Techincal Report, vol. 100, No. 490, NC2000-80, pp. 53-58 (Dec. 1, 2000) (Translated Abstract).

"Tutorial Koen" by hideki Kawahara, Chokaku jokei Bunseki to Onsei Chikakul, EICH Techincal Report, vol. 105, No. 478, PRMU2005-128, pp. 1-6 (Dec. 9, 2005) (Translated Abstract).

International Search Report for PCT/JP2007/00698 (Sep. 4, 2007).

International Search Report for PCT/JP2007/00699 (Sep. 4, 2007).

*Primary Examiner* — Curtis Kuntz

*Assistant Examiner* — Paul McCord

(74) *Attorney, Agent, or Firm* — Matthew B. Dernier, Esq.; Gibson & Dernier LLP

(57) ABSTRACT

A user selects a plurality of pieces of music data desired to be reproduced concurrently, at an input unit of an audio processing apparatus, from music data stored in a storage device. A reproducing apparatus reproduces selected music data respectively and generates a plurality of audio signals under the control of a control unit. An audio processing unit performs allocation of frequency band, extraction of a frequency component, time-division, periodic modulation, processing and allocation of a sound image, to respective audio signals under the control of the control unit. Then the audio processing unit attaches segregation information of audio signals and information on the degree of emphasis to respective audio signals. The down mixer mixes a plurality of audio signals and outputs as an audio signal having a predetermined number of channels, then an output unit outputs the signal as sounds.

9 Claims, 7 Drawing Sheets

10

FIG.7

112 114

| TITLE | PATTERN GROUP |
|---|---|
| TUNE a | A |
| TUNE b | B |
| TUNE c | A |
| TUNE d | C |
| ... | ... |

110

FIG.8

122 124 126 128 130

| FOCUS VALUE | TIME-DIVISION | MODULATION | PROCESSING | LOCALIZATION-SETTING |
|---|---|---|---|---|
| 0.8~1.0 | ○ | ○ | × | CENTER |
| 0.4~0.79 | ○ | × | ○ | RIGHT SIDE· LEFT SIDE |
| 0.1~0.39 | ○ | × | ○ | ENDS |

120

AUDIO PROCESSING APPARATUS AND AUDIO PROCESSING METHOD

TECHNICAL FIELD

The present invention generally relates to a technology for processing audio signals and more particularly, to an audio processing apparatus mixing a plurality of audio signals and outputting them, and to an audio processing method applied to the apparatus.

BACKGROUND TECHNOLOGY

With the developments of information processing technology in recent years, it has become easy to obtain an enormous number of contents easily via recording media, networks, broadcast waves or the like. For example, in case of music contents, downloading from a music distribution site via a network is generally practiced in addition to purchasing a recording medium such as a CD (Compact Disc) or the like that stores music contents. Including data recorded by a user himself/herself, contents stored in a PC, a reproducing apparatus or a recording medium have been increasing. Therefore a technology becomes necessary to search through an enormous number of contents for one desired content easily. One of those technologies is displaying data as thumbnails.

Displaying data as thumbnails is a technology where a plurality of still images or moving images are displayed on a display all at once as still images or moving images of reduced size. By displaying data as thumbnails, it has become possible to grasp the contents of data at a glance and to select a desired data exactly, even in case that a lot of image data, which is taken by a camera or a recorder and is accumulated or which is downloaded, is stored and their attribute information (e.g., file names, the date of recording or the like) is difficult to comprehend. Furthermore, by glimpsing a plurality of pieces of image data, all the data can be appreciated quickly or the contents of recording media or the like, which stores the data, can be grasped at short times.

DISCLOSURE OF THE INVENTION

Problem to be Solved by the Invention

Displaying data as thumbnails is a technology where a part of a plurality of contents is visually input to a user in parallel. Therefore, audio data (e.g., music data or the like) which can not be arranged visually are not able to use thumbnails by definition without the mediation of additional image data, such as, the image of an album jacket or the like. However, the number of pieces of audio data owned by an individual, such as music contents or the like, has been increasing. Thus, as with image data, there is a need for selecting desired audio data easily or a need for appreciating data quickly, also in case that the data can not be identified with clues like the title, the date of acquisition or the additional image data.

In this background, the general purpose of the present invention is to provide a technology for allowing one to hear a plurality of pieces of audio data concurrently while aurally separated.

Means to Solve the Problem

According to one embodiment of the present invention, an audio processing apparatus is provided. The audio processing apparatus reproduces a plurality of audio signals concurrently and comprises; an audio processing unit operative to perform a predetermined processing on respective input audio signals so that a user hears the signals separately with the auditory sense, and an output unit operative to mix the plurality of input audio signals on which the processing is performed, and to output as an output audio signal having a predetermined number of channels, where the audio processing unit further comprises a frequency-band-division filter operative to allocate a block selected from plurality of blocks made by dividing a frequency band for each of the plurality of input audio signals using a predetermined rule, and operative to extract a frequency component belonging to the allocated block from each input audio signal, and the frequency-band-division filter allocates a noncontiguous plurality of blocks to at least one of the plurality of input audio signals.

According to another embodiment of the present invention, an audio processing method is provided. The audio processing method comprises; allocating a frequency band to each of a plurality of input audio signals so that the frequency bands do not mask each other, extracting a frequency component belonging to the allocated frequency band from each audio signal, and mixing a plurality of audio signals comprising the frequency components extracted from respective input audio signals and outputting as an output audio signal having a predetermined number of channels.

Optional combinations of the aforementioned constituting elements, and implementations of the invention in the form of methods, apparatuses, systems, computer programs, may also be practiced as additional modes of the present invention.

Effect of the Invention

The present invention enables to perceive a plurality of audio data concurrently while aurally separated.

BRIEF DESCRIPTION OF THE DRAWINGS

FIG. 7 shows an example of information on music data stored in a storage unit according to the present embodiment.

FIG. 8 shows an exemplary table which is stored in a storage unit and which associates focus values and settings for respective filters, each other.

DESCRIPTION OF THE REFERENCE NUMERALS

10 . . . audio processing system, 12 . . . storage device, 14 . . . reproducing apparatus, 16 . . . audio processing apparatus, 18 . . . input unit, 20 . . . control unit, 22 . . . storage unit, 24 . . . audio processing unit, 26 . . . down mixer, 30 . . . output unit, 40 . . . pre-process unit, 42 . . . frequency-band-division filter, 44 . . . time-division filter, 46 . . . modulation filter, 48 . . . processing filter, 50 . . . localization-setting filter.

BEST MODE FOR CARRYING OUT THE INVENTION

Figure 1:
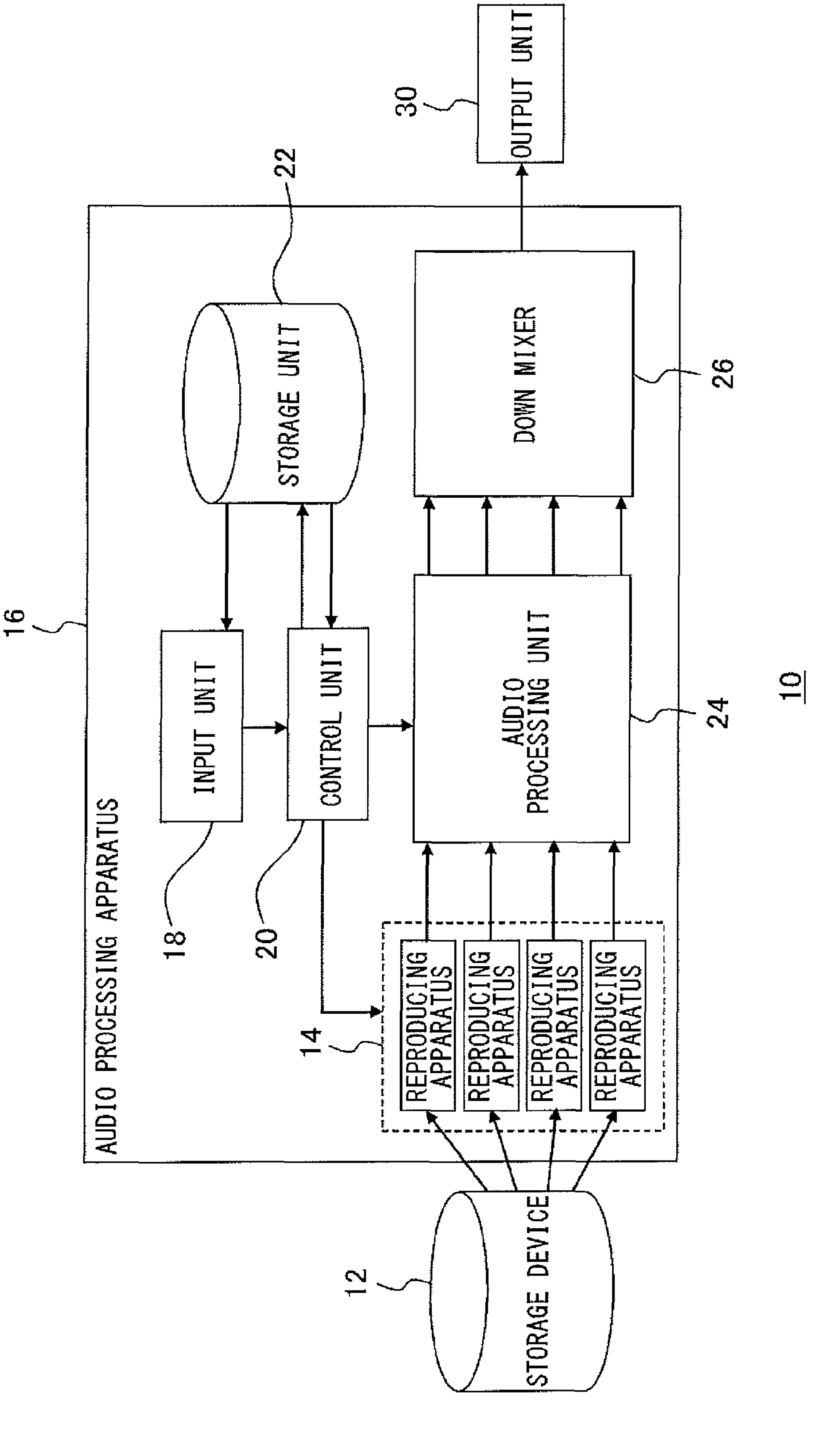
FIG. 1 shows the entire configuration of an audio processing system including an audio processing apparatus according to the present embodiment.

FIG. 1 shows the entire configuration of an audio processing system including an audio processing apparatus according to the present embodiment. The audio processing system according to the present embodiment concurrently reproduces a plurality of pieces of audio data stored by a user into a storage device, such as a hard disk or the like, or a recording medium. Then the system applies filtering process to a plurality of audio signals obtained through the reproducing, mixes the signals and makes an output audio signal having a desired number of channels and outputs the signal from an output device, such as a stereo, an earphone or the like.

Mere mixing and outputting a plurality of audio signals make signals counteract each other or make only one audio signal to be heard distinctively, thus it is difficult for respective audio signals to be recognized independently as with image data displayed as thumbnails. Therefore, the audio processing apparatus according to the present embodiment separates a plurality of audio signals aurally by approaching the auditory periphery and the auditory center, which are included in the mechanisms for allowing human beings to perceive sound. That is, the apparatus separates respective audio signals relatively at the level of auditory periphery, i.e., the inner ear, and gives a clue for perceiving separated signals independently at the level of auditory center, i.e., the brain. This process is the filtering process described above.

Furthermore, the audio processing apparatus according to the present embodiment emphasizes a signal of audio data, to which a user pays attention, among mixed output audio signals, like the case where a user focuses attention on one thumbnail image among thumbnails representing image data. Alternatively, the apparatus outputs a plurality of signals while changing the degree of emphasis for respective signals step by step or continuously in a similar fashion that a user moves the point of view among the image data displayed as thumbnails. The "degree of emphasis" here refers to the perceivability, i.e., easiness in aural recognition, of a plurality of audio signals. For example, when the degree of emphasis for a signal is higher than that of other signals, the signal may be heard more clearly, more largely or as if it is heard from a nearer place, than the other signals. The degree of emphasis is a subjective parameter, which takes into account how human beings feel in a comprehensive way.

In case of changing the degree of emphasis, there is a possibility that mere controlling volume makes an audio data signal to be emphasized be cancelled by other audio signals, then the signal can not be heard well, the effect of the emphasis can not be sufficient or sound of other audio data which has not been emphasized can not be heard at all, which make the concurrent reproducing meaningless. This is because the auditory perceivability of human beings is linked closely to the characteristic of frequency or the like, other than volume. Therefore, the specifics of the filtering process described above are adjusted so that a user can recognize the change in the degree of emphasis requested by the user himself/herself. The mechanism of the filtering process described above and specifics of the process will be described later in details.

In the following explanation, audio data represents, but is not limited to, music data. The audio data may represent other data for sound signals as well, such as human voice in comic story telling or a meeting, an environmental sound, sound data included in broadcasting wave or the mixture of those signals.

The audio processing system 10 includes a storage device 12, an audio processing apparatus 16 and an output unit 30. The storage device 12 stores a plurality of pieces of music data. The audio processing apparatus 16 performs processes on a plurality of audio signals, which are generated by reproducing a plurality of pieces of music data respectively, so that the signals can be heard separately. Then the apparatus mixes the signals while reflecting the degree of emphasis requested by the user. The output unit 30 outputs the mixed audio signals as sounds.

The audio processing system 10 may be configured to be integral with or locally connected with a personal computer or a music reproducing apparatus such as a portable player or the like, or the like. In this case, a hard disk or a flash memory or the like may be used as the storage device 12. A processor unit or the like may be used as the audio processing apparatus 16. As the output unit 30, may be used an internal speaker or a speaker connected externally, an earphone, or the like. Alternatively, the storage device 12 may be configured as a hard disk or the like in a server connected to the audio processing apparatus 16 via a network. Further, the music data stored in the storage device 12 may be encoded using an encoding method used commonly, such as MP3 or the like.

The audio processing apparatus 16 includes an input unit 18, a plurality of reproducing apparatuses 14, an audio processing unit 24, a down mixer 26, a control unit 20 and a storage unit 22. The input unit 18 acknowledges a user's instruction on the selection of music data to be reproduced or on emphasis. The reproducing apparatuses 14 reproduces the plurality of pieces of music data selected by a user and renders a plurality of audio signals. The audio processing unit 24 applies a predetermined filtering process to the plurality of audio signals respectively to allow the user to recognize the distinction among or the emphasis on the audio signals. The down mixer 26 mixes the plurality of audio signals to which the filtering process is applied and generates an output signal having a desired number of channels. The control unit 20 controls the operation of the reproducing apparatus 14 or of the audio processing unit 24 according to the user's selection instruction concerning the reproduction or the emphasis. The storage unit 22 stores a table necessary for the control unit 20 to control, i.e., predetermined parameters or information on respective music data stored in the storage device 12.

The input unit 18 provides an interface to input an instruction for selecting a plurality of desired music data among music data stored in the storage device 12 or an instruction for changing a target music data to be emphasized among a plurality of music data on reproduction. The input unit 18 is configured with, for example, a display apparatus and a pointing device. The display apparatus reads information, such as an icon symbolizing the selected music data, from the storage unit 22, displays the list of the information and displays a cursor. The pointing device moves the cursor and selects a point on the screen. Alternatively, the input unit 18 may be configured with any of input apparatuses or display apparatuses commonly used, such as a keyboard, a trackball, a button, a touch panel, or an optional combination thereof.

In the following explanation, each piece of music data stored in the storage device 12 represents data for one tune, respectively. Thus it is assumed that an instruction is input and processing is performed for each tune. However, the same explanation is applied to a case that each piece of music data represents a set of a plurality of tunes, such as an album.

If the input unit 18 receives a user's input for selecting music data to be reproduced, the control unit 20 provides information on the input to the reproducing apparatus 14, obtains a necessary parameter from the storage unit 22 and initializes the audio processing unit 24 so that appropriate process is performed for respective audio signals of the music data to be reproduced. Further, if an input for selecting the music data to be emphasized is received, the control unit 20 reflects the input by changing the setting of the audio processing unit 24. The description on specifics of the setting will be given later in detail.

The reproducing apparatus 14 decodes a piece of data selected from music data stored in the storage device 12 as appropriate and generates an audio signal. FIG. 1 shows four reproducing apparatuses 14 assuming that four of pieces of music data can be reproduced concurrently. However, the number of the reproducing apparatuses is not limited to four. Furthermore, the reproducing apparatus 14 may be configured as one apparatus in external appearance in case that reproducing processes can be performed in parallel by, e.g., a multiprocessor or the like. However, FIG. 1 shows the reproducing apparatuses 14 as separate processing units, which reproduce respective music data and generate respective audio signals.

By performing filtering processes like ones described above, on respective audio signals corresponding to the selected music data, the audio processing unit 24 generates a plurality of audio signals which can be perceived aurally separated and on which the degree of emphasis requested by a user is reflected. The detailed description will be given later.

The down mixer 26 performs a variety of adjustments if necessary, then mixes the plurality of audio signals and outputs the signals as an output signal having a predetermined number of channels, such as monophonic, stereophonic, 5.1 channel or the like. The number of the channels may be fixed, or may be set changeable with hardware or software by the user. The down mixer 26 may be configured with a down mixer used commonly.

The storage unit 22 may be a storage element or a storage device, such as a memory, a hard disk or the like. The storage unit 22 stores information on music data stored in the storage device 12, a table which associates an index indicating the degree of emphasis and a parameter defined in the audio processing unit 24, or the like. The information on music data may include any information commonly used, such as the name of a tune corresponding to music data, the name of a performer, an icon, a genre or the like. The information on music data may further include a part of parameters which will be necessary at the audio processing unit 24. The information on music data may be read and stored in the storage unit 22 when the music data is stored in the storage device 12. Alternatively, the information on music data may be read from the storage device 12 and stored in the storage unit 22 every time the audio processing apparatus 16 is operated.

To illustrate the detail of processing performed in the audio processing unit 24, an explanation will be given of fundamental principle for identifying a plurality of sounds, which sound concurrently. Human beings recognize a sound in two steps, i.e., a perception of the sound at the ears and an analysis of the sound at the brain. To identify respective sounds emitted from different sound sources concurrently, human beings have to obtain information which indicates that the sounds come from different sources, that is, segregation information, at one of or both of those two steps. For example, by hearing different sounds by the right ear and the left ear respectively, the segregation information can be acquired at the level of the inner ear, thus the sounds are analyzed as different sounds in the brain and can be recognized. If the sounds are mixed from the beginning, the sounds can be segregated at the brain level by analyzing difference in auditory stream or tone timbre, in the light of the segregation information learned and memorized from the life until now.

In case of mixing a plurality of pieces of music and hearing from one pair of speakers or earphones, the segregation information at the inner ear level can not be obtained intrinsically, thus the sounds shall be recognized at the brain based on the difference in auditory stream or sound timbre as described above. Nevertheless, the sounds which can be identified in those manners are limited and it is almost impossible to apply the methods to a wide variety of music. Therefore, the present inventor has conceived the method where the segregation information approaching the inner ear or the brain is attached to audio signals artificially to generate audio signals which can be recognized separately even if the signals are mixed eventually.

Figure 2:
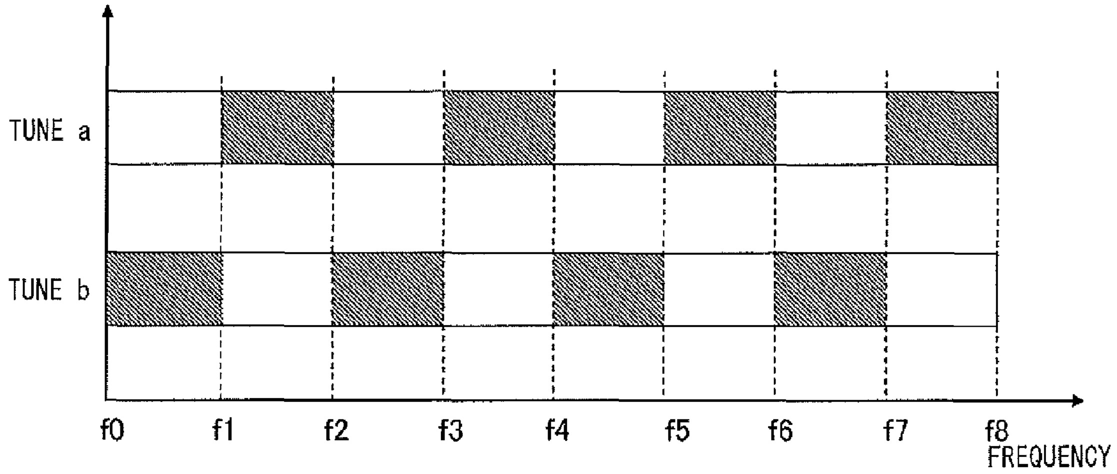
FIG. 2 is a diagram for explaining the frequency band division of audio signals, according to the present embodiment.

Initially, an explanation will be given of the division of an audio signal into frequency bands and the time division of an audio signal as a method to give segregation information at the inner ear level. FIG. 2 is a diagram for explaining the frequency band division. The horizontal axis in FIG. 2 indicates frequency where frequencies f0 to f8 represents audible frequency band. Although FIG. 2 shows the case where two tunes, i.e., "tune a" and "tune b", are mixed and heard, the number of the tunes may be any numbers. In the method for frequency band division, the audible band is divided into a plurality of blocks and each block is allocated to at least one of the plurality of audio signals. Then the method extracts only a frequency component, which belongs to the allocated block, from each audio signal.

In FIG. 2, the audible band is divided into eight blocks by frequencies f1, f2, □□□ and f7. Then, for example, four blocks, i.e., f1~f2, f3~f4, f5~f6, f7~f8 are allocated to the "tune a" and four blocks, i.e., f0~f1, f2~f3, f4~f5, f6~f7 are allocated to the "tune b", as marked with diagonal lines. By setting the boundary frequencies of the blocks (i.e., f1, f2, □□□ and f7) to, for example, any of the boundary frequencies of twenty-four critical bands of Bark's scale, the effect of the frequency band division can be realized more advantageously.

The critical band refers to a certain frequency band. When a sound having the certain frequency band masks other sound, a masking quantity does not increase even if the sound having the certain frequency band extends its bandwidth. The masking here refers to a phenomenon where the minimum audible value for a certain sound increases because of the presence of other sound, i.e., the certain sound becomes hardly audible. The masking quantity refers to the increase of that minimum audible value. That is to say, sounds which belong to different critical bands are hardly masked each other. By dividing a frequency band using twenty-four critical bands of Bark's scale, it becomes possible to suppress an influence such that a frequency component belonging to frequency block of f1~f2 of the "tune a" does not mask the frequency component belonging to frequency block of f2~f3 of the "tune b", etc. The same is true for other blocks and as a result, the "tune a" and the "tune b" become audio signals, which rarely cancel each other.

The frequency band does not have to be divided into blocks according to the critical band. In any of the cases, by diminishing overlapping frequency bands, the segregation information can be provided using the frequency resolution ability of the inner ear.

Although in the example shown in FIG. 2, each block has a comparable bandwidth, in practice, the bandwidth may vary depending on frequency band. For example, a band having two critical bands in one block and a band having four critical bands in one block may be present as well. The way how to divide into blocks (hereinafter referred to as a division pattern) may be determined in consideration of general characteristics of sounds, for example, sound having low frequency band is hardly masked, etc, or may be determined in consideration of the characteristic frequency band for respective tunes. The characteristic frequency band here represents a frequency band, which is important in the expression of the tune, for example, a frequency band dominated by a main melody or the like. In case that the characteristic frequency bands for more than one tune are anticipated to overlap, it is preferable that the overlapping band is divided further and allocated to the tunes evenly so as to prevent troubles such as the failure of the main melody to be heard, etc.

Although in the example shown in FIG. 2, the succession of blocks are allocated to the "tune a" and the "tune b" alternately, the way how to allocate blocks is not limited to this manner. For example, consecutive two blocks may be allocated to the "tune a". Also in this case, it is preferable to determine how to allocate so that a negative effect caused by dividing the frequency band is suppressed at least in the important part of the tunes. For example, if a frequency band which is characteristic of a certain tune dominates two consecutive blocks, the two blocks are allocated to the tune, preferably.

Meanwhile, it is preferable to allow the number of the blocks to surpass the number of tunes which are to be mixed and to allow a plurality of discontinuous blocks to be allocated to one tune, except in a particular kind of case where, for example, it is desired to mix three tunes which are biased toward high frequency band, middle frequency band, and low frequency band, respectively. This is for a similar reason as described above, i.e., to prevent the characteristic frequency band of a certain tune from being allocated to another tune, and to perform the allocation approximately evenly with a wider band. Thus, it becomes possible to allow all the tunes to be heard equally, even if the characteristic frequency bands for more than one tune are overlapped.

Figure 3:
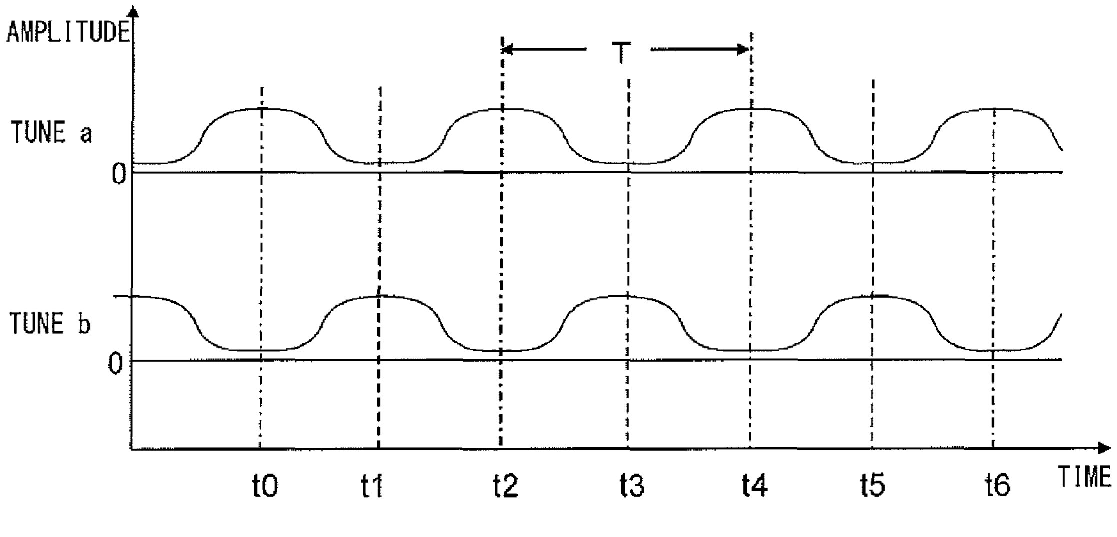
FIG. 3 is a diagram for explaining the time division of audio signals according to the present embodiment.

FIG. 3 is a diagram for explaining the time division of audio signals. The horizontal axis in the FIG. 3 indicates time and the vertical axis indicates the amplitude of the audio signals i.e., the volume of sound. Also in this instance, one example is shown where two tunes, i.e., a "tune a" and a "tune b", are mixed and heard. With the time division method, the amplitudes of audio signals are changed at a common period while the phase of each signal is shifted so that peaks thereof occur at different times for respective tunes. Since this method approaches the inner ear level, the period may range from tens of milliseconds to hundreds of milliseconds.

In FIG. 3, the amplitudes of audio signals for the "tune a" and the "tune b" are changed at a common period T. The amplitude of the "tune b" is reduced at time t0, t2, t4 and t6 when the amplitude of the "tune a" is at its peaks and the amplitude of the "tune a" is reduced at time t1, t3 and t5 when the amplitude of the "tune b" is at its peaks. In practice, the amplitude may also be modulated so that the time when the amplitude reaches the maximum or the minimum has a certain duration. In this case, time slots when the amplitude of the "tune a" is at the minimum may be adjusted to coincide with time slots when the amplitude of the "tune b" is at the minimum. Even in case of mixing more than two tunes, the time slots when the amplitude of the "tune b" is at the maximum and the time slots when the amplitude of the tune c is at the maximum are set to coincide the time slots when the amplitude of the "tune a" is at the minimum.

On the other hand, a sinusoidal modulation may also be performed. With the sine wave, the time when the amplitude reaches its peak does not last more than a moment. In this case, phases are just shifted so that the peaks occur at different times. In any of the cases, segregation information is provided using the time resolution ability of the inner ear.

Subsequently, an explanation will be given of a method to provide the segregation information at the brain level. The segregation information provided at the brain level gives a clue to recognize the auditory stream of each sound when the sound is analyzed in the brain. The present embodiment introduces a method where a particular change is given to an audio signal periodically, a method where a process is applied to the audio signal constantly, and a method where the position of a sound image is changed. With the method where the particular change is given to the audio signal periodically, the amplitude or the frequency characteristic of all or a part of audio signals to be mixed is changed, etc. The modulation may be generated in a short time period in pulse form, or may be generated so as to vary gradually in a long time period, e.g., a several seconds. When applying the same modulation to a plurality of audio signals, the signals are adjusted so that peaks of each signal occur at different times for respective audio signals.

Alternatively, a noise such as a clicking sound or the like may be added periodically, a filtering process implemented by an audio filter used commonly may be applied or the position of a sound image may be shifted from side to side, etc. By combining those modulations, by applying different modes of modulation to different audio signals, or by shifting the timing, etc, a clue for realizing the auditory stream of the audio signals can be provided.

With the method where a processing is applied to the audio signal constantly, one of or a combination of audio processing may be performed, such as echoing, reverbing, pitch-shifting, or the like, that can be implemented by an effecter used commonly. Frequency characteristic may be set different from that of the original audio signal, constantly. For example, by applying the echoing process to one of the tunes, tunes are easily recognized as different tunes, even if the tunes are performed at a same tempo with the same music instrument. Naturally, in case of applying processes to a plurality of audio signals, the type of processes or the level of processes shall be set different for respective audio signals.

With the method where the position of the sound image is changed, different positions of sound images are provided to all the audio signals to be mixed, respectively. This allows the brain to analyze spatial information of the sounds in corporation with the inner ear, which allows the audio signals to be segregated easily.

Figure 4:
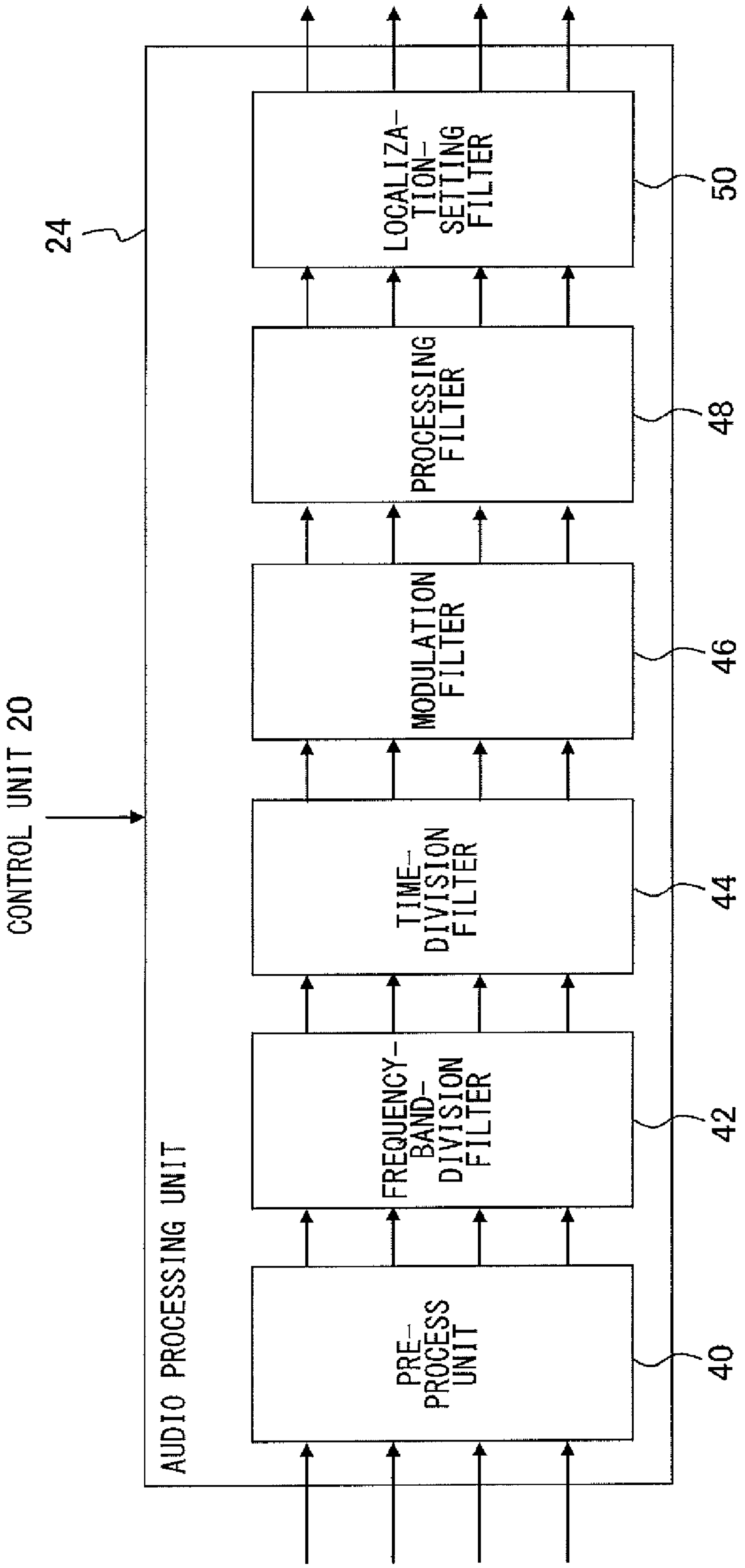
FIG. 4 shows the structure of an audio processing unit according to the present embodiment in detail.

By utilizing the principle described above, the audio processing unit 24 in the audio processing apparatus 16 according to the present embodiment applies a process to respective audio signals so that the signals can be recognized separately with the auditory sense when mixed. FIG. 4 shows the structure of the audio processing unit 24 in detail. The audio processing unit 24 includes a pre-process unit 40, a frequency-band-division filter 42, a time-division filter 44, a modulation filter 46, a processing filter 48 and a localization-setting filter 50. The pre-process unit 40 may be an auto gain controller used commonly or the like and adjusts gains so that the sound volume of a plurality of signals input from the reproducing apparatus 14 becomes approximately uniform.

The frequency-band-division filter 42 allocates blocks, obtained by dividing the audible band, to respective audio signals as described above, then extracts a frequency component belonging to the allocated block from respective audio signals. The frequency component can be extracted by, for example, configuring the frequency-band-division filter 42 with band pass filters (not shown) which are set for respective channels and for respective blocks of the audio signals. A division pattern or a pattern describing how to allocate a block to an audio signal (hereinafter referred to as an allocation pattern) can be changed by allowing the control unit 20 to control each band pass filter or the like, and to define the setting on a frequency band or an available band pass filter. Description on concrete example of the allocation pattern will be given later.

The time-division filter 44 performs the method for time-dividing audio signals as described above and modulates the amplitudes of respective audio signals temporally by shifting phases of the respective signals at a period ranging from tens of milliseconds to hundreds of milliseconds. The time-division filter 44 can be implemented by, for example, controlling the gain controller along the time axis. The modulation filter 46 performs the method for giving a particular change to the audio signals periodically, and can be implemented by, for example, controlling a gain controller, an equalizer, an audio filter or the like along the time axis. The processing filter 48 performs the method for constantly applying a particular effect (hereinafter referred to as processing treatment) to audio signals as described above, and can be implemented by, for example, an effecter or the like. The localization-setting filter 50 performs the method for changing the position of the sound image and can be implemented by, for example, a panpot.

As described above, according to the present embodiment, a plurality of audio signals, which are mixed, are recognized aurally separated and then a certain audio signal is heard emphatically. Therefore, a process is changed in the frequency-band-division filter 42 or in other filters, according to the degree of emphasis requested by the user. Further, a filter which passes the audio signals is selected according to the degree of emphasis. In the latter case, for example, a demultiplexer is connected to an output terminal on respective filters, the terminal outputting audio signals. In this case, by setting whether or not an input to a subsequent filter is permitted, using a control signal from the control unit 20, change can be effected to select or not to select the subsequent filter.

Figure 5:
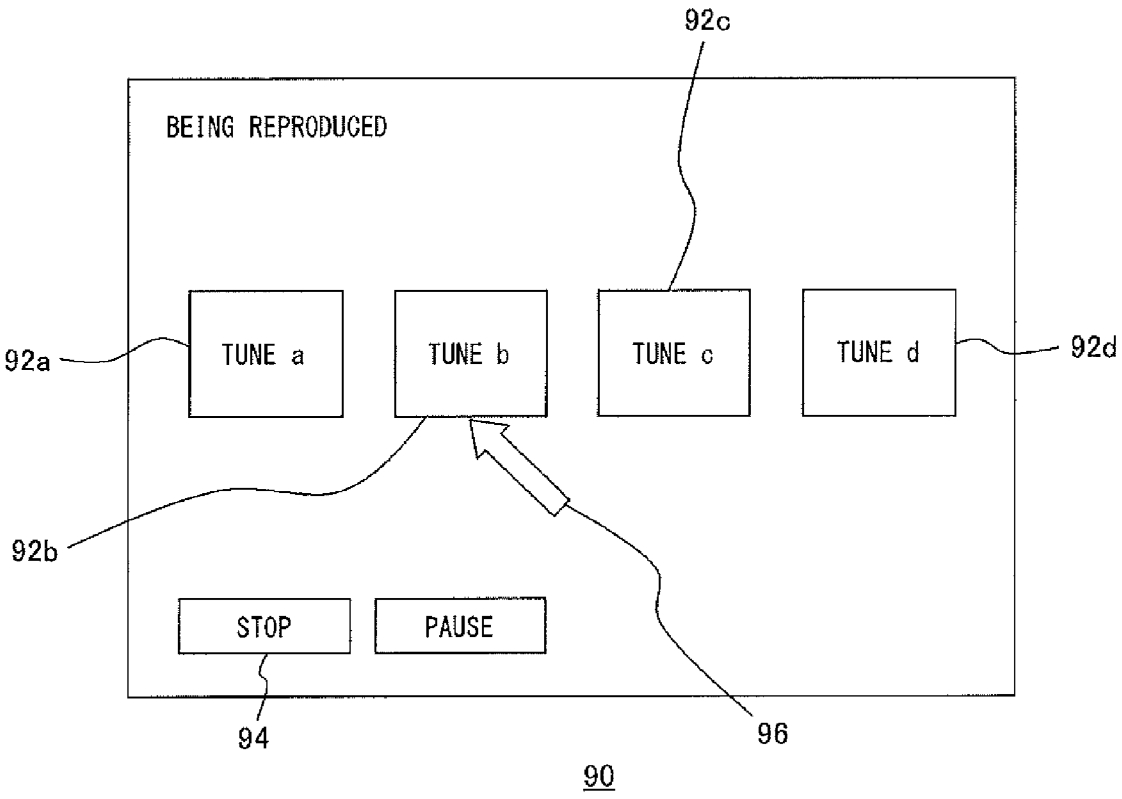
FIG. 5 shows an exemplary screen displayed on an input unit of an audio processing apparatus according to the present embodiment.

Next, an explanation will be given of a concrete method for changing the degree of emphasis. Initially, one example is given for explaining a manner in which the user selects music data to be emphasized. FIG. 5 shows an exemplary screen displayed on the input unit 18 of the audio processing apparatus 16 in the state where four pieces of music data have been selected and audio signals thereof are mixed and output. The input screen 90 includes icons 92*a*, 92*b*, 92*c* and 92*d*, a "stop" button 94, and a cursor 96. The icons 92*a*, 92*b*, 92*c* and 92*d* correspond to music data of which the names are "tune a", "tune b", "tune c" and "tune d", respectively. The "stop" button 94 stops the reproduction.

When the user moves the cursor 96 on the input screen 90 while data are being reproduced, the audio processing apparatus 16 determines music data, which is indicated by an icon pointed by the cursor, as the target to be emphasized. In FIG. 5, since the cursor 96 points to the icon 92*b* of the "tune b", music data corresponding to the icon 92*b* is determined as the target to be emphasized and the control unit 20 operates so as to emphasize the audio signal thereof at the audio processing unit 24. In this instance, an identical filtering process may be applied to the other three tunes at the audio processing unit 24 as tunes not to be emphasized. This allows the user to hear the four tunes concurrently and separately while hearing the "tune b" quite distinctly.

Meanwhile, the degree of emphasis for music data, which is not to be emphasized, may be changed, according to the distance from the cursor 96 to an icon corresponding to the music data. In the example shown in FIG. 5, the highest degrees of emphasis is given to music data corresponding to the icon 92*b* of the "tune b", indicated by the cursor 96. The middle degree of emphasis is given to music data corresponding to the icon 92*a* of the "tune a" and the icon 92*c* of the "tune c" which are placed at a comparable distance from the point indicated by the cursor 96. Then the lowest degree of emphasis is given to music data corresponding to the icon 92*d* of the "tune d" which are placed at the farthest point from the point indicated by the cursor 96.

With this embodiment, even if the cursor 96 does not indicate any of the icons, the degree of emphasis can be determined according to the distance from the point indicated by the cursor. For example in case that the degree of emphasis is changed continuously according to the distance from the cursor 96, a tune can sound as though an audio source approaches or moves away in accordance with the movement of the cursor 96 in a similar manner as a viewing point is shifted on displayed thumbnails gradually. Icons themselves may be moved by a user input which indicates right or left without adopting the cursor 96. For example, the nearer to the center of the screen the icon is placed, the higher the degree of emphasis may be set.

The control unit 20 acquires information on the movement of the cursor 96 in the input unit 18. Then the control unit 20 defines an index indicating the degree of emphasis of music data corresponding to each icon, according to, for example, the distance from the point indicated by the cursor, etc. Hereinafter this index is referred to as a focus value. The explanation of the focus value is given here only as an example and the focus value may be any index such as a numeric value, a graphic symbol, or the like as far as the index is able to determine the degree of emphasis. For example, each focus value may be defined independently regardless of the position of the cursor. Alternatively, the focus value may be determined to be a value proportional to the full value.

Figure 6:
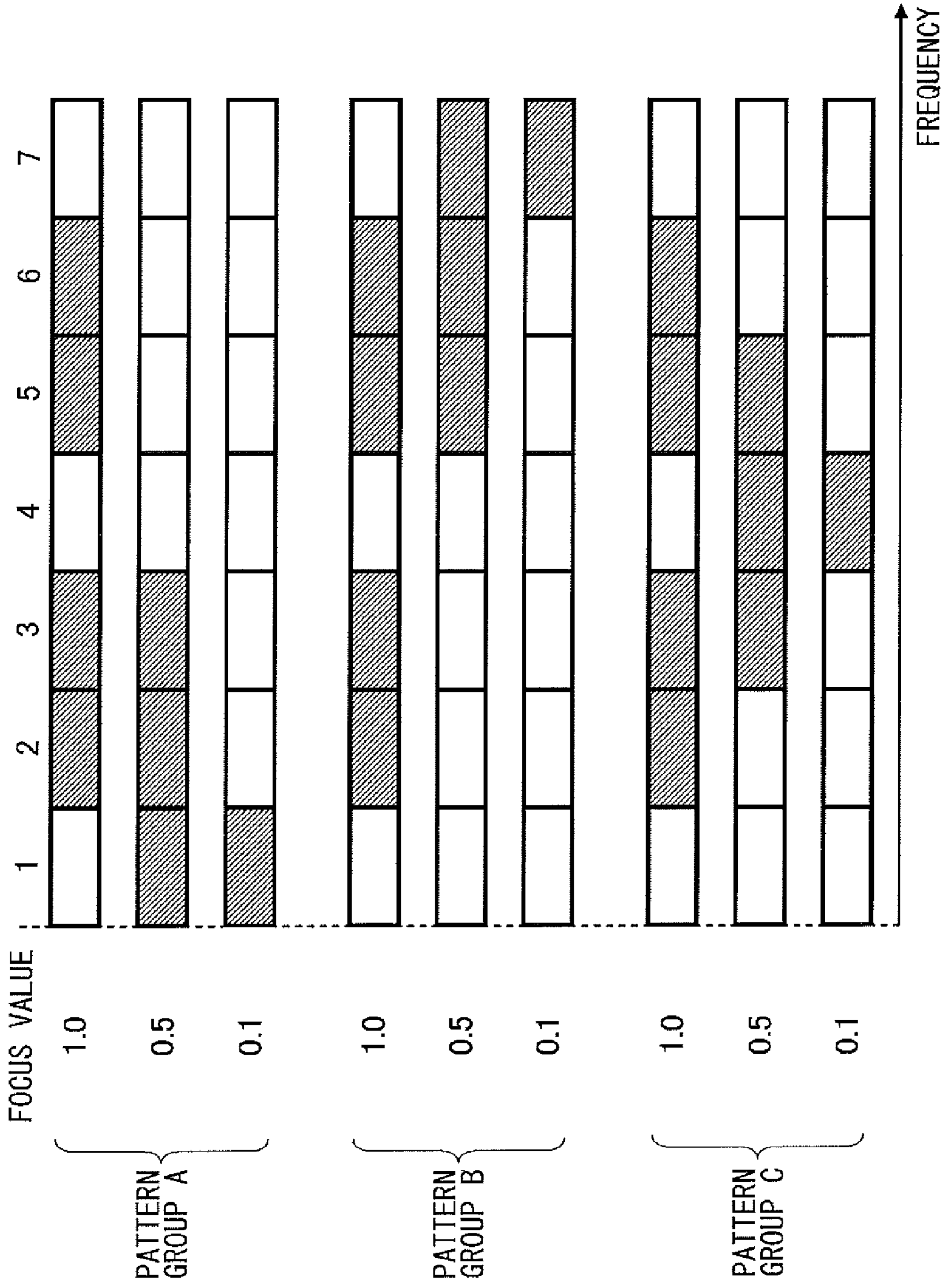
FIG. 6 is a schematic diagram showing the pattern of block allocation according to the present embodiment.

Next, an explanation will be given of a method for changing the degree of emphasis in the frequency-band-division filter 42. In FIG. 2, frequency band blocks are allocated almost evenly to the "tune a" and the "tune b" to explain the method for allowing recognition of a plurality of audio signals as separate signals. On the other hand, a larger or smaller number of blocks are allocated to allow a certain audio signal to sound emphatically and another audio signal to sound obscurely. FIG. 6 is a schematic diagram showing the pattern of block allocation.

FIG. 6 shows a case where the audible band is divided into seven blocks. In a similar fashion as shown in FIG. 2, the horizontal axis indicates frequency. The blocks are referred to as block 1, block 2, □□□, and block 7 from the low frequency side. Initially, first three allocation patterns described as "pattern group A" will be highlighted. The values written at the left side of respective allocation patterns indicate the focus values. The pattern of values "1.0", "0.5" and "0.1" are shown as examples. In this case, the larger the focus value is, the higher the degree of emphasis. The maximum value for the focus value is set to 1.0 and the minimum value is set to 0.1. If the degree of emphasis for a certain audio signal is set to the maximum, i.e., the signal is adjusted so that the signal is most easily heard compared with other audio signals, the allocation pattern with the focus value of 1.0 is applied to that audio signal. According to the "pattern group A" in FIG. 6, the four blocks, i.e., block 2, block 3, block 5 and block 6, are allocated to the audio signal.

If the degree of emphasis of the same audio signal is to be lowered, the allocation pattern is changed, for example to the allocation pattern of the focus value of 0.5. According to the "pattern group A" in FIG. 6, the three blocks, i.e., block 1, block 2 and block 3 are to be allocated. In a similar manner, if the degree of emphasis of the same audio signal is set to the minimum level, i.e., the signal is adjusted so that the signal sounds most obscurely while remaining as audible, the allocation pattern is changed to the allocation pattern with the focus value of 0.1. According to the "pattern group A" in FIG. 6, one block, i.e., block 1 is to be allocated. In this way, the focus values are changed based on the requested degree of emphasis. That is, in case that the focus value is large, a large number of blocks are allocated and in case that the focus value is small, a small number of blocks are allocated. This can provides information on the degree of emphasis at the inner ear level and enables to recognize whether or not the sound is emphasized.

As shown in FIG. 6, it is preferable that not all the blocks be allocated to one signal, even to an audio signal with the focus value of 1.0. In FIG. 6, block 1, block 4 and block 7 are not allocated. This is because, for example, if the block 1 is also allocated to the audio signal with the focus value of 1.0, there is a possibility that the signal may mask a frequency component of another audio signal which has the focus value of 0.1 and to which only the block 1 is allocated. To make the degrees of emphasis of the signals vary, high and low, while a plurality of audio signals are heard separately, it is preferable in the present embodiment that a signal be heard even if the signal has a low degree of emphasis. Therefore, a block which is allocated to an audio signal with the lowest or low degree of emphasis shall not be allocated to an audio signal with the highest or high degree of emphasis.

Although in FIG. 6, the allocation patterns are shown with only three steps of focus values, i.e., 0.1, 0.5 and 1.0, in case that allocation patterns are predetermined with many focus values, a threshold value may be set for focus values and an audio signal having a focus value equal to or less than the threshold value may be defined as a signal not to be emphasized. Then the allocation patterns may be set so that a block, which is allocated to the audio signal not to be emphasized, is not allocated to an audio signal which has a focus value larger than the threshold value and which is to be emphasized. Two threshold values may be used when sorting signals into signals to be emphasized and signals not to be emphasized.

Although the above explanation is given while highlighting the "pattern group A", the similar explanation is applied to the "pattern group B" and the "pattern group C". The three sorts of pattern groups, i.e., "pattern group A", "pattern group B" and "pattern group C" are made available here so that blocks to be allocated for audio signals having focus values of 0.5, 1.0 or the like do not overlap as much as possible. For example, if three pieces of music data are to be reproduced, "pattern group A", "pattern group B" and "pattern group C" are applied to three audio signals corresponding to the data, respectively.

In this instance, even if all the audio signals have a focus value of 0.1, different blocks are allocated to the signals for "pattern group A", "pattern group B" and "pattern group C", thus the signals are easily heard distinctly while separated. In any of the pattern groups, a block allocated at focus value of 0.1 is a block which is not allocated at the focus value of 1.0. The reason for this is as described above.

Although in case of the focus value of 0.5, There are block overlapping among "pattern group A", "pattern group B" and "pattern group C", the number of blocks overlapping between two of the pattern groups is one at its maximum. In this manner, in case of setting the degree of emphasis to the audio signals to be mixed, the blocks to be allocated to the audio signals may overlap among each other. However, the segregation and the emphasis can be attained simultaneously, by adopting a scheme, such as, limiting the number of overlapping blocks to its minimum, avoiding the allocation of blocks, which are to be allocated to audio signals having a low degree of emphasis, to other audio signals, etc. Further, if there are overlapping blocks, the process may be adjusted so that the segregation level is supplemented in filters other than the frequency-band-division filter 42.

The allocation patterns of blocks shown in FIG. 6 are stored in the storage unit 22, in association with the focus values. Then the control unit 20 determines the focus value for each audio signal according, for example, to the movement of the cursor 96 in the input unit 18, and acquires a block to be allocated by reading an allocation pattern corresponding to the focus value, from the storage unit 22, among the pattern groups allocated to the audio signal in advance. The setting of an effective band pass filter or the like is performed on the frequency-band-division filter 42 in accordance with the block.

The allocation pattern stored in the storage unit 22 may include a pattern for a focus value other than 0.1, 0.5 and 1.0. However, since the number of blocks are finite, allocation patterns which can be prepared in advance are limited. Therefore, for a focus value which is not stored in the storage unit 22, an allocation pattern is determined by interpolating the allocation pattern of a nearest focus value among focus values around the desired focus value and stored in the storage unit 22. The method for an interpolation is, for example, adjusting a frequency band to be allocated by further dividing the blocks, or adjusting the amplitude of a frequency component belonging to a certain block. In the latter case, the frequency-band-division filter 42 includes a gain controller.

For example, in case that given three blocks are allocated at the focus value of 0.5 and two blocks among the three blocks are allocated at the focus value of 0.3, at the focus value of 0.4, one of halved frequency band of the remaining block, which is not allocated at the focus value of 0.3, is allocated. Alternatively, the remaining block is allocated and only the amplitude of the frequency component thereof is halved. Although the linear interpolation is performed in this example, the linear interpolation may not be used necessarily, in case of considering that the focus value indicating the degree of emphasis is a sensuous and subjective value based on the auditory perception of the human beings. A rule for interpolation may be set in advance using a table or a mathematical expression obtained by performing a laboratory experiment on how the signals sound in practice, etc. The control unit 20 performs the interpolation according to the setting thereof and applies the setting to the frequency-band-division filter 42. This enables to set the focus value almost continuously and allows the degree of emphasis to change continuously in its appearance according to the movement of the cursor 96.

The allocation pattern to be stored into the storage unit 22 may include a several kinds of series of different division patterns. In this case, at the time point when music data is selected for the first time, it is determined which division pattern is applied. When determining, information on respective music data can be used as a clue as will be described later. The division pattern is reflected in the frequency-band-division filter 42 by, for example, allowing the control unit 20 to set the maximum and the minimum frequency for the band pass filter, etc.

Which allocation pattern group is to be allocated to each audio signal may be determined based on the information on music data corresponding to the signal. FIG. 7 shows one example of the information on music data stored in the storage unit 22. The music data information table 110 includes a title field 112 and a pattern group field 114. The title of a tune corresponding to respective audio data is described in the title field 112. The field may be replaced by a field for describing other attribute as far as the attribute identifies music data, for example ID of the music data or the like.

In the pattern group field 114 is described the name or the ID of an allocation pattern group recommended for respective music data.

As a basis for selecting the recommended pattern group, a frequency band characteristic for the music data may be used. For example, a pattern group which allocates a characteristic frequency band when the focus value for the music signal becomes 0.1, is recommended. This makes the most important component of an audio signal be hardly masked, even if the signal is not emphasized, by another audio signal having the a same focus value or by another audio signal having a high focus value. Thus the signal can be heard more easily.

This embodiment can be implemented by, for example, standardizing the pattern groups and IDs thereof and by allowing a vender or the like, who provides the music data, to attach a recommended pattern group to music data as information on the music data, etc. On the other hand, instead of the name or the ID of the pattern group, a characteristic frequency band can be used as the information to be attached to the music data. In this case, the control unit 20 may read the characteristic frequency band for respective music data from the storage device 12 in advance, may select a pattern group most appropriate to that frequency band and generate the music data information table 110, and may store the table into the storage unit 22. Alternatively, a characteristic frequency band may be determined based on the genre of music, the sort of a music instrument, or the like and thereby a pattern group may be selected.

In case that information to be attached to the music data is information on characteristic frequency band, the information itself may be stored in the storage unit 22. In this case, by considering the characteristic frequency bands of a plurality of pieces of music data to be reproduced comprehensively, an optimum division pattern can be selected firstly and an allocation pattern can be selected accordingly. Furthermore, a new division pattern may be generated at the beginning of the process, based on the characteristic frequency band. A similar procedure can be applied in case of determining by the genre or the like.

Next, an explanation will be given of the case where the degree of emphasis is changed in filters other than the frequency-band-division filter 42. FIG. 8 shows an exemplary table which is stored in the storage unit 22 and which associates the focus values and the settings for respective filters with each other. The filter information table 120 includes a focus value field 122, a time division field 124, a modulation field 126, a process field 128 and a localization-setting field 130. The range of the focus values is described in the focus value field 122. For each value range described in the focus value field, if the processing is performed by the time-division filter 44, the modulation filter 46 or the processing filter 48, "O" is entered and if the process is not performed, "X" is entered in the time division field 124, the modulation field 126 or the process field 128, respectively. Notation other than "O" or "X" may also be used as far as it identifies whether or not to perform the filtering processing.

In the localization setting field 130 is indicated which position of the sound image is to be given, by "center", "rightward/leftward", "end" or the like, for each value range described in the focus value field. The change of the degree of emphasis can be detected easily also based on the position of sound images, by localizing the sound image at the center when the focus value is high and by moving the sound image away from the center as the focus value becomes lower, as shown in FIG. 8. When localizing, the right side and the left side may be defined and arranged randomly or may be defined based on the position of the icon of music data on the screen. Further, the direction, from which the audio signal to be emphasized sounds, may be changed corresponding to the movement of the cursor. This can be implemented by defining the setting of the localization setting field 130 as invalid so that the position of the sound image does not change based on the focus value, and by providing respective audio signals with the position of its sound image corresponding to the position of the icon on a constant basis. The filter information table 120 may further include information on whether or not to select the frequency-band-division filter 42.

If there are a plurality of processes which can be performed by the modulation filter 46, or the processing filter 48, or the degree of the processes can be adjusted using an inner parameter, specific processing details or the inner parameters may be indicated in the respective fields. For example, if the time when an audio signal reaches its peak is to be changed based on the degree of emphasis in the time-division filter 44, that time is described in the time division field 124. The filter information table 120 is created in advance by a laboratory experiment or the like while considering how the filters affect each other. In this manner, a sound effect suitable for unemphasized audio signals is selected, or it is prevented to apply processing excessively to the audio signals which sound already separated. A plurality of filter information tables 120 may be prepared so that an optimum table is selected based on the information on music data.

Every time the focus value crosses the boundary of the ranges indicated in the focus value field 122, the control unit 20 refers to the filter information table 120 and reflects that in the inner parameters of respective filters, the setting of demultiplexer, or the like. This enables the audio signals to sound more distinctively while reflecting the degree of emphasis. For example, an audio signal with a large focus value sounds clearly from the center and an audio signal with a small focus value sounds muffled from the end.

Figure 9:
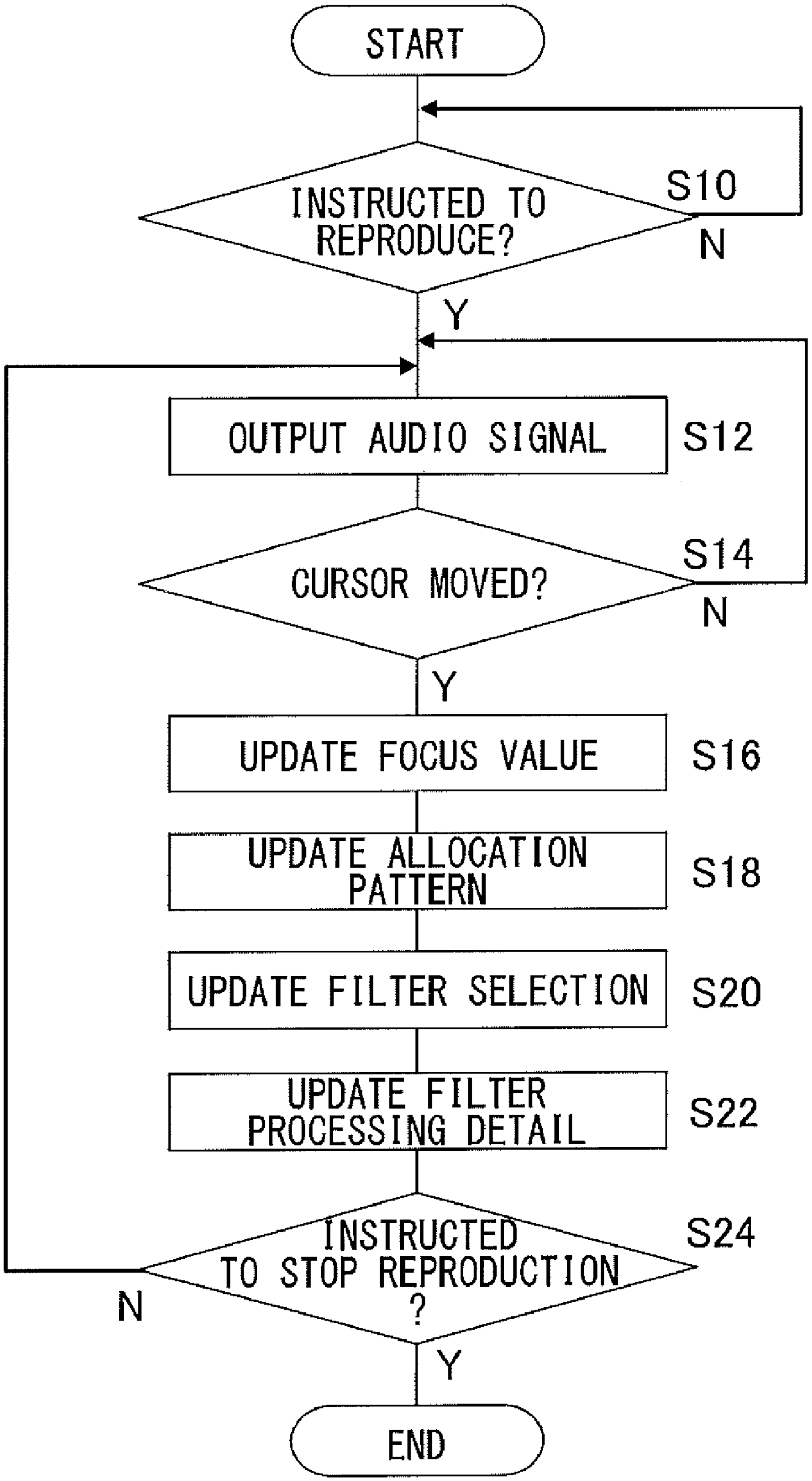
FIG. 9 is a flowchart showing the operation of an audio processing apparatus according to the present embodiment.

FIG. 9 is a flowchart showing the operation of the audio processing apparatus 16 according to the present embodiment. Firstly, the user selects and inputs through the input unit 18, a plurality of audio data which he/she wants to reproduce concurrently, among audio data stored in the storage device 12. If the input for the selection is detected in the input unit 18 (Y in S10), the reproduction of the music data, various filtering process, and mixing process is performed, under the control of the control unit 20 and the output unit 30 outputs accordingly (S12). Also, the division pattern of blocks to be used at the frequency-band-division filter 42 is selected and the allocation pattern groups are allocated to respective audio signals, then the pattern is set for the frequency-band-division filter 42. Initial setting for other filters are performed in a similar manner. The output signals at this stage may be equalized in the degree of emphasis by setting a same value to all the focus values. In this instance, respective audio signals are heard by the user evenly while separated.

At the same time, the input screen 90 is displayed on the input unit 18 and mixed output signals are continuously output while it is monitored whether or not the user moves the cursor 96 on the screen (N in S14, S12). If the cursor 96 moves (Y in S14), the control unit 20 updates the focus value for each audio signal in accordance with the movement (S16), reads the allocation pattern of the blocks corresponding to the value from the storage unit 22 and updates the setting of the frequency-band-division filter 42 (S18). From the storage unit 22, the control unit 20 further reads information on filters which perform processing and information on processing details at respective filters or on inner parameters, the information being set for the range of the focus value, then updates the setting of each filter as appropriate (S20, S22), accordingly. The processing from step S14 to step S22 may be performed in parallel with the outputting of the audio signals at step S12.

These processes are repeated every time the cursor moves (N in S24, S12~22). This can implement an embodiment which allows the degree of emphasis for respective audio signals to vary, high or low, and the degree also varies with time according to the movement of the cursor 96. As a result, the user can obtain a feel as if the source of the audio signal moves away or approaches according to the movement of the cursor 96. Then all the processing ends, for example, in case that the user selects the "stop" button 94 on the input screen 90 (Y in S24).

According to the present embodiment described above, a filtering process is applied to each audio signal so that the signals can be heard separately when mixed. To be more precise, the segregation information is provided at the inner ear level, by distributing frequency bands or time slots to respective audio signals, or the segregation information is provided at the brain level by providing changes periodically, by applying sound processing treatment or by providing different positions of sound image to some or all of the audio signals. In this manner, the segregation information can be obtained at both inner ear level and at brain level when respective audio signals are mixed, and eventually signals are easily separated and recognized. As a result, the sounds themselves can be observed simultaneously as though viewing displayed thumbnails, thus it becomes possible to check music contents or the like easily without spending much time even in case of checking a lot of contents.

Furthermore, the degree of emphasis for each audio signal is changed according to the present embodiment. To be more precise, depending on the degree of emphasis, the frequency bands to be allocated is increased, the filtering processing is performed with variety of intensity or the filtering process to apply is changed. This allows an audio signal with high degree of emphasis to sound more distinctively than other audio signals. In this case too, care is taken, for example, to ensure that a frequency band to be allocated to audio signals with low degree of emphasis is not used so that the audio signals with low degree of emphasis are not cancelled. As a result, an audio signal of note can be heard distinctively as if being focused while a plurality of audio signals can be heard respectively. By applying this in a time variant manner according to the movement of the cursor moved by the user, changes in the way how the sound is heard can be generated according to the distance from the cursor as if a viewing point is shifted on the displayed thumbnails. Therefore, a desired content can be selected easily and intuitively from a large number of music contents or the like.

Given above is an explanation based on the exemplary embodiments. These embodiments are intended to be illustrative only and it will be obvious to those skilled in the art that various modifications to constituting elements and processes could be developed and that such modifications are also within the scope of the present invention.

For example, according to the present embodiment, the degree of emphasis is also changed while allowing the audio signals to be heard separately. However, depending on the purpose, the degree of emphasis may not be changed and all the audio signals may just sound evenly. An embodiment with a uniform degree of emphasis is implemented by the similar configuration by, for example, invalidating the setting of focus values or adopting a fixed focus value. This also allows a plurality of audio signals to be heard separately, and makes it possible to grasp a lot of music contents or the like, easily.

Further, according to the present embodiment, the explanation is given while mainly assuming the case of appreciating music contents. However, the present invention is not limited in this case. For example, the audio processing apparatus shown in the embodiment may be provided in the audio system of a TV receiver. In this case, while multi channel images are displayed according to the user's instruction to the TV receiver, sounds for respective channels are mixed and output after a filtering process is performed. In this manner, sounds can be appreciated concurrently while distinguished among others, in addition to the multi channel images. If the user selects a channel in this state, the sound of the selected channel can be emphasized, while allowing sounds of other channels to be heard. Furthermore, even in displaying the image of a single channel, when listening to the main audio and the second audio simultaneously, the degree of emphasis can be changed in a stepwise fashion. Thus a sound desired to be heard mainly can be emphasized without sounds canceling each other.

Further, as shown in FIG. 6, according to the frequency-band-division filter of the present embodiment, an explanation is given for an example where the allocation pattern for each focus value is fixed based on a rule that a block allocated to an audio signal with the focus value of 0.1 is not allocated to an audio signal with a focus value of 1.0. On the other hand, during a period or in a state where the audio signal with the focus value of 0.1 is not present, all the blocks to be allocated to the audio signal with the focus value of 0.1 may be allocated the audio signal with the focus value of 1.0.

For instance, in the example shown in FIG. 6, in case that only three pieces of music data are selected to be reproduced, the "pattern group A", the "pattern group B" and the "pattern group C" may be allocated to the three audio signals corresponding to the data, respectively. Thus, the allocation pattern for the focus value 1.0 and the pattern for the focus value of 0.1, both belonging to a same pattern group, never coexist. In this case, to the audio signal to which the pattern group A is allocated, a block in the lowest frequency range, which is to be allocated at the focus value of 0.1, can also be allocated at the same time when the focus value is 1.0. In this manner, the allocation pattern may be set changeably according to, for example, the number of audio signals corresponding to respective focus values, or the like. By this, the number of blocks which are allocated to the audio signals to be emphasized can be increased as much as possible as far as the unemphasized audio signals can be recognized. Thus the sound quality of the audio signals to be emphasized can be increased.

Furthermore, the entirety of the frequency band may be allocated to the audio signal to be emphasized. In this way, that audio signal is further emphasized and its quality is further increased. Also in this case, it is possible to allow other audio signals to be recognized separately by providing the segregation information using a filter other than the frequency-band-division filter.

INDUSTRIAL APPLICABILITY

As mentioned above, the present invention is applicable to electronics devices, such as, audio reproducing apparatuses, computers, TV receivers, or the like.

What is claimed is:

1. An audio processing apparatus which reproduces a plurality of audio signals concurrently, comprising;

an audio processing unit operative to perform a predetermined processing on respective input audio signals so that a user hears the signals separately via auditory sense, the audio processing unit comprising a frequency-band-division filter operative to: (i) allocate a block selected from plurality of blocks made by dividing a frequency band for each of the plurality of input audio signals using a predetermined rule that employs a boundary frequency of Bark's critical bands, and (ii) extract a frequency component belonging to the allocated block from each input audio signal, a characteristic-band-extracting unit operative to determine a block to be allocated with priority, among the plurality of blocks, for each of the plurality of input audio signals, and an output unit operative to mix the plurality of input audio signals on which the processing is performed, and to output as an output audio signal having a predetermined number of channels, wherein the frequency-band-division filter allocates a non-contiguous plurality of blocks to at least one of the plurality of input audio signals, and allocates blocks other than the block which is allocated to a certain input audio signal predetermined by the characteristic-band-extracting unit with priority, to other input audio signals.

2. The audio processing apparatus according to claim 1, where the characteristic-band-extracting unit reads predetermined information on respective input audio signals from an external storage device, and based on that information, determines a block to be allocated to respective input audio signals with priority.

3. The audio processing apparatus according to claim 1 where the audio processing unit further comprises a time-division filter operative to modulate the respective amplitudes of the plurality of input audio signals temporally at a common period so that the phases differ.

4. The audio processing apparatus according to claim 3 where the time-division filter modulates each of the plurality of input audio signals temporally so that times when the amplitude of the respective input audio signals reaches its maximum and its minimum have a predetermined time-width, and makes phases differ so that at a time when the amplitude of a certain input audio signal reaches its minimum, the amplitude of another input audio signal reaches its maximum.

5. The audio processing apparatus according to claim 1 where the audio processing unit further comprises a modulation filter operative to apply a predetermined sound processing at a predetermined period to at least one of the plurality of input audio signals.

6. The audio processing apparatus according to claim 1 where the audio processing unit further comprises a processing filter operative to apply a predetermined sound processing treatment to at least one of the plurality of input audio signals, constantly.

7. The audio processing apparatus according to claim 1 where the audio processing unit further comprises a localization-setting filter operative to provide different sound images to the plurality of input audio signals, respectively.

8. An audio processing method comprising:

allocating a frequency band to each of a plurality of input audio signals so that the frequency bands do not mask each other by dividing a frequency band for each of the plurality of input audio signals using a predetermined rule that employs a boundary frequency of Bark's critical bands, extracting a frequency component belonging to the allocated frequency band from each audio signal, determining a block to be allocated with priority, among the plurality of blocks, for each of the plurality of input audio signals, allocating a noncontiguous plurality of blocks to at least one of the plurality of input audio signals, and allocating blocks other than the block which is allocated to a certain input audio signal determined with priority, to other input audio signals, and mixing a plurality of audio signals comprising the frequency components extracted from respective input audio signals and outputting as an output audio signal having a predetermined number of channels.

9. A non-transitory, computer readable storage medium containing a computer program product, comprising:

a module which refers to a memory storing patterns of blocks selected from a plurality of blocks made by dividing a frequency band with a predetermined rule by dividing a frequency band for each of a plurality of input audio signals using a predetermined rule that employs a boundary frequency of Bark's critical bands, and allocates the pattern to each of a plurality of input audio signals, a module which extracts a frequency component belonging to a block included in the allocated pattern, from respective input audio signals, determining a block to be allocated with priority, among the plurality of blocks, for each of the plurality of input audio signals, allocating a noncontiguous plurality of blocks to at least one of the plurality of input audio signals, and allocating blocks other than the block which is allocated to a certain input audio signal determined with priority, to other input audio signals, and a module which mixes a plurality of audio signals comprising frequency components extracted from respective input audio signals and which outputs as an output signal having a predetermined number of channels.

* * * * *